(12) United States Patent
Chishima et al.

(10) Patent No.: US 8,565,816 B2
(45) Date of Patent: *Oct. 22, 2013

(54) MOBILE COMMUNICATION TERMINAL AND CONTROL METHOD THEREOF

(75) Inventors: Makoto Chishima, Yokohama (JP);
Tetsuya Takenaka, Yokohama (JP);
Ryuta Fujisawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 626 days.

This patent is subject to a terminal disclaimer.

(21) Appl. No.: 12/665,694

(22) PCT Filed: Jun. 19, 2008

(86) PCT No.: PCT/JP2008/061196
§ 371 (c)(1),
(2), (4) Date: May 25, 2010

(87) PCT Pub. No.: WO2008/156130
PCT Pub. Date: Dec. 24, 2008

(65) Prior Publication Data
US 2010/0234075 A1    Sep. 16, 2010

(30) Foreign Application Priority Data

Jun. 20, 2007  (JP) ................................ 2007-163010
Feb. 28, 2008  (JP) ................................ 2008-048144
Feb. 28, 2008  (JP) ................................ 2008-048156
Feb. 28, 2008  (JP) ................................ 2008-048243
Feb. 28, 2008  (JP) ................................ 2008-048246

(51) Int. Cl.
*H04M 1/00*         (2006.01)

(52) U.S. Cl.
USPC ................... 455/556.1; 455/127.4; 455/558; 455/574

(58) Field of Classification Search
USPC ...................................................... 455/556.1
See application file for complete search history.

(56) References Cited

U.S. PATENT DOCUMENTS

| 7,324,835 B2 * | 1/2008 | Chen et al. ..................... 455/558 |
| 2005/0101350 A1 * | 5/2005 | Wang .............................. 455/558 |

(Continued)

FOREIGN PATENT DOCUMENTS

| JP | 09-322228 | 12/1997 |
| JP | 10-210550 | 8/1998 |

(Continued)

OTHER PUBLICATIONS

Notification of Reason for Refusal for JP 048,144/2008, mailed Oct. 11, 2011, 2 pages.

(Continued)

*Primary Examiner* — Ajibola Akinyemi
(74) *Attorney, Agent, or Firm* — Duane Morris LLP

(57) ABSTRACT

A mobile communication terminal in accordance with the present invention includes a first wireless communication unit 102 corresponding to a first wireless communication system and an interface 107 capable of detachably connecting an external apparatus 200. The mobile communication terminal for starting up a communication operating system using a battery as a power supply includes a determination unit 112 for determining whether or not the external apparatus 200 connected to the interface 107 has a second wireless communication unit 202 corresponding to a second wireless communication system and a control unit 112 for controlling the communication operating system to be started up by executing a start-up sequence of the second wireless communication unit 202 without executing a start-up sequence of the first wireless communication unit 102 in a case where the determination unit 112 determines that the second wireless communication unit 202 is included when the communication operating system is started up again after being disabled due to a decline in the battery voltage. Thus, the multi-mode communication based on the battery voltage can be executed efficiently and user convenience can be improved.

14 Claims, 12 Drawing Sheets

(56) References Cited

U.S. PATENT DOCUMENTS

| | | | |
|---|---|---|---|
| 2005/0159179 A1* | 7/2005 | Sainton et al. | 455/552.1 |
| 2005/0288003 A1* | 12/2005 | Matsumura | 455/418 |
| 2006/0223465 A1* | 10/2006 | Akiba et al. | 455/127.4 |

FOREIGN PATENT DOCUMENTS

| | | |
|---|---|---|
| JP | 11-252006 | 9/1999 |
| JP | 2000-197126 | 7/2000 |
| JP | 2002-125265 | 4/2002 |
| JP | 2004-088521 | 3/2004 |
| JP | 2004-128574 | 4/2004 |
| JP | 2004-187351 A | 7/2004 |
| JP | 2006-332728 | 12/2006 |
| WO | WO-2004/023741 | 3/2004 |

OTHER PUBLICATIONS

Notification of Reason for Refusal for JP 048,156/2008, mailed Oct. 11, 2011, 2 pages.

Notification of Reason for Refusal for JP 048,246/2008, mailed Oct. 11, 2011, 2 pages.

International Search Report for PCT/JP2008/061196, mailed Jul. 29, 2008, 4 pages.

Official Decision of Refusal (with translation) for JP 2008-048156, mailed Jun. 19, 2012, 4 pages.

Office Action mailed Aug. 20, 2013, issued in Japanese Patent Application No. 2010-500678 (statement of relevance included), 5 total pages.

* cited by examiner

| | | |
|---|---|---|
| Infrared | Camera | microSD |
| FeliCa | TV/FM | Data folder |
| Carrier browser | Music Player | Accessory |
| Messenger | Function | Game |

□▼₁₁ WiFi

Internet | Selection | Change

106

(b)

□OFF ▼ WiFi Sub  5/19 TUE 20:30
Low Battery Main System OFF

| | | |
|---|---|---|
| Infrared | Camera | microSD |
| FeliCa | TV/FM | Data folder |
| Carrier browser | Music Player | Accessory |
| Messenger | Function | Game |

Internet | Selection | Change

MOBILE COMMUNICATION TERMINAL AND CONTROL METHOD THEREOF

CROSS REFERENCE TO RELATED APPLICATIONS

This application is a U.S. National Phase Application of International Application No. PCT/JP2008/061196 filed on Jun. 19, 2008, which claims priority to and the benefit of Japanese Patent Application No. 2007-163010 filed on Jun. 20, 2007 and Japanese Patent Application Nos. 2008-48156, 2008-48144, 2008-48243 and 2008-48246 filed on Feb. 28, 2008, the entireties of which are incorporated herein by reference.

TECHNICAL FIELD

The present invention relates to a mobile communication terminal and a control method thereof.

BACKGROUND ART

Various wireless communication systems such as PDC (Personal Digital Cellular), W-CDMA (Wideband Code Division Multiple Access), cdma2000 1x, PHS (Personal Handy-phone System), wireless LAN (WLAN: Wireless Local Area Network) and Bluetooth have conventionally been operated as a mobile communication system. In addition, standardization of high-speed wireless communication such as WiMAX (Worldwide Interoperability for Microwave Access) has been progressed. Each of these wireless communication systems has a different characteristic.

For example, in PHS, it is possible to take many usable terminals per unit area because a cell area is small. Therefore it has the advantage of high frequency-use efficiency. In addition, a PHS terminal is required to receive only individual call signals (PCH: Paging Channel) while connecting to a cell station (CS) and its interval is long, and thus it has also the advantage of long standby time. However, since the area covered by one cell is small, it has the disadvantage of high possibility of discontinuation of communication when communication is performed while moving at a high speed.

On the other hand, for example, W-CDMA has a wide cell area. Therefore it can be used while moving in a wide range at a high speed. However, a W-CDMA terminal performs despread processing and the like for monitoring an incoming call and a signal level of a cell and the like, and therefore its standby time is much shorter than that of the PHS terminal.

Further, with respect to WLAN as typified by widely-used IEEE (Institute of Electrical and Electronic Engineers) 802.11b, hotspots are installed in coffee shops, public facilities and the like and it can communicate at rates up to 11 Mbps. However, such WLAN is provided on the assumption of indoor use, and therefore the cell area is small such as about 10 m in radius.

Incidentally, a mobile communication terminal is generally driven by a battery. Therefore, in the case of a cellular phone terminal, for example, when a battery is consumed while in use, a power supply is turned off, and call (communication) is disabled. In this case, although functions other than call (communication) are available, the power supply of the cellular phone terminal is turned off. Therefore, functions such as an address book and the like also become unavailable, and thus it is not possible to know contact information such as a phone number when a user needs to contact someone in an emergency.

In order to solve such problem, for example, Japanese Patent Application Laid-Open Publication No. 2004-128574 proposes cellular phone terminals which allow a user to use functions such as an address book and the like to the end. The cellular phone terminals proposed gradually limit usable functions based on a remaining battery level, turn off power while keeping enough remaining battery level, or allow a user to use an address book using a sub-display that consumes less power than a main display after the power supply is turned off.

SUMMARY OF INVENTION

Technical Problems

However, as described in the above conventional art, even if the address book of the terminal can be used in a state where communication is not possible, there may be no communication means such as public phones and the like nearby, and thus an emergency contact cannot be made, causing concern about a decline in convenience. Further, even if there is a public phone nearby, data transmission is impossible.

Particularly, in recent years, coffee shops, fast-food shops, public facilities and the like in which a hotspot is installed have increased, and public phones have decreased accordingly. Thus the above concern becomes apparent.

On the other hand, recently, a multi-mode mobile communication terminal that can use different wireless communication systems has been considered. These multi-mode mobile communication terminals may be configured to interpolate a wireless communication unit (hereinafter occasionally referred to as a main communication unit) of a wireless communication system (hereinafter occasionally referred to as a main system), which is a primary section, and to add a wireless communication unit (hereinafter occasionally referred to as a sub-communication unit) of a wireless communication system, which is a secondary section, (e.g. WLAN, Bluetooth and the like: hereinafter occasionally referred to as a sub-system) by inserting an SD card (Secure Digital card) or connecting a USB (Universal Serial Bus) and the like via an interface.

In the case of such configuration, the power consumed by the added sub-communication unit is generally less than that consumed by the interpolated main communication unit. Further, each communication unit is used for an independent system. Therefore it is possible to execute different communications by selecting the main communication unit and the sub-communication unit simultaneously or to execute a desired communication by selecting either one of them.

Thus it is preferred for such a mobile communication terminal to execute multi-mode communication based on the battery voltage when a sub-communication unit is added.

Therefore, it is an object of the present invention in order to respond such needs to provide a mobile communication terminal and a control method thereof which can efficiently execute multi-mode communication based on the battery voltage and can improve user convenience.

Solutions to Problems

In order to achieve the above object, in a mobile communication terminal including a first wireless communication unit corresponding to a first wireless communication system and an interface capable of detachably connecting an external apparatus, and for starting up a communication operating system using a battery as a power supply, the invention of the mobile communication terminal in accordance with a first aspect includes:

a determination unit for determining whether or not the external apparatus connected to the interface includes a second wireless communication unit corresponding to a second wireless communication system; and a control unit for controlling the communication operating system to be started up by executing a start-up sequence of the second wireless communication unit without executing a start-up sequence of the first wireless communication unit, in a case where the determination unit determines that the second wireless communication unit is included when the communication operating system is started up again after being disabled due to a decline in voltage of the battery.

In the invention in accordance with a second aspect, the second wireless communication unit has less power consumption than the first wireless communication unit in the mobile communication terminal in accordance with the first aspect.

In the mobile communication terminal in accordance with the first aspect, the invention in accordance with a third aspect further includes:

a storage unit for storing a first threshold of battery voltage at which the communication operating system is disabled after starting up the communication operating system by executing the start-up sequence of the first wireless communication unit and a second threshold of battery voltage that is lower than the first threshold and at which the communication operating system is disabled after starting up the communication operating system by executing the start-up sequence of the second wireless communication unit without executing the start-up sequence of the first wireless communication unit; and a battery voltage detection unit for detecting voltage of the battery, wherein the control unit controls the communication operating system to be disabled when the battery voltage detected by the battery voltage detection unit is equal to or less than the second threshold after starting up the communication operating system by executing the start-up sequence of the second wireless communication unit.

In the mobile communication terminal in accordance with the second aspect, the invention in accordance with a fourth aspect further includes:

a storage unit for storing a first threshold of battery voltage at which the communication operating system is disabled after starting up the communication operating system by executing the start-up sequence of the first wireless communication unit and a second threshold of battery voltage that is lower than the first threshold and at which the communication operating system is disabled after starting up the communication operating system by executing the start-up sequence of the second wireless communication unit without executing the start-up sequence of the first wireless communication unit; and a battery voltage detection unit for detecting voltage of the battery, wherein the control unit controls the communication operating system to be disabled when the battery voltage detected by the battery voltage detection unit is equal to or less than the second threshold after starting up the communication operating system by executing the start-up sequence of the second wireless communication unit.

In the mobile communication terminal in accordance with the first aspect, the invention in accordance with a fifth aspect further includes:

a display unit for displaying a display screen indicating that the first wireless communication unit cannot be used when the control unit starts up the communication operating system by executing the start-up sequence of the second wireless communication unit without executing the start-up sequence of the first wireless communication unit.

In the invention in accordance with a sixth aspect, the display unit displays a display screen on which an activation display of an application that cannot be used unless the first wireless communication unit is used is not displayed in the mobile communication terminal in accordance with the fifth aspect.

In the invention in accordance with a seventh aspect, the display unit displays a display screen on which an activation display of an application that cannot be used unless the first wireless communication unit is used is not selectable in the mobile communication terminal in accordance with the fifth aspect.

In the invention in accordance with an eighth aspect, the display unit changes a display screen so that an activation display of an application that cannot be used unless the first wireless communication unit is used is replaced with an activation display of an application that can be executed by the second wireless communication unit in the mobile communication terminal in accordance with the fifth aspect.

In the mobile communication terminal in accordance with the first aspect, the invention in accordance with a ninth aspect further includes:

a power supply operation unit for ON and OFF operations of a power supply; and a display unit for displaying a screen to select either to execute the start-up sequence of the first wireless communication unit or to turn off the power supply when the power supply operation unit is operated in a state where the control unit starts up the communication operating system by executing the start-up sequence of the second wireless communication unit without executing the start-up sequence of the first wireless communication unit.

In the mobile communication terminal in accordance with the ninth aspect, the invention in accordance with a tenth aspect includes:

a battery voltage detection unit for detecting voltage of the battery; and a detection unit for detecting whether or not the battery is being charged, wherein, the control unit executes the start-up sequence of the first wireless communication unit when execution of the start-up sequence of the first wireless communication unit is selected; and the display unit indicates that the first wireless communication unit is controlled to be in a disabled state if charge is discontinued, in a case where the battery voltage detected by the battery voltage detection unit is equal to or less than a first predetermined value in a state where the detection unit detects that the battery is being charged.

In the invention in accordance with an eleventh aspect, the display unit indicates that the first wireless communication unit is not controlled to be in a disabled state even if charge is discontinued, in a case where the battery voltage detected by the battery voltage detection unit exceeds the first predetermined value in a state where the detection unit detects that the battery is being charged in the mobile communication terminal in accordance with the tenth aspect.

In the mobile communication terminal in accordance with the first aspect, the invention in accordance with a twelfth aspect further includes:

a battery voltage detection unit for detecting voltage of the battery, wherein, the control unit controls the start-up sequence of the first wireless communication unit to be executed when the battery voltage detected by the battery voltage detection unit exceeds a second predetermined value in a state where the communication operating system is started up by executing the start-up sequence of the second wireless communication unit without executing the start-up sequence of the first wireless communication unit.

In the mobile communication terminal in accordance with the first aspect, the invention in accordance with a thirteenth aspect further includes:

a display unit for displaying a battery mark indicating a remaining battery level based on the second wireless communication unit when the control unit starts up the communication operating system by executing the start-up sequence of the second wireless communication unit without executing the start-up sequence of the first wireless communication unit.

In the invention in accordance with a fourteenth aspect, the display unit displays, as the battery mark based on the second wireless communication unit, a remaining level mark indicating a remaining battery level in a more segmentalized display manner than a battery mark based on the first wireless communication unit in the mobile communication terminal in accordance with the thirteenth aspect.

Further, in order to achieve the above object, when controlling a mobile communication terminal including a first wireless communication unit corresponding to a first wireless communication system and an interface capable of detachably connecting an external apparatus, and for starting up a communication operating system using a battery as a power supply, the invention of a control method of the mobile communication terminal in accordance with a fifteenth aspect includes:

a determination step of determining whether or not the external apparatus connected to the interface includes a second wireless communication unit corresponding to a second wireless communication system; and a control step of controlling the communication operating system to be started up by executing a start-up sequence of the second wireless communication unit without executing a start-up sequence of the first wireless communication unit, in the case where the determination step determines that the second wireless communication unit is included when the communication operating system is started up again after being disabled due to a decline in voltage of the battery.

In the control method of the mobile communication terminal in accordance with the fifteenth aspect, the invention in accordance with a sixteenth aspect further includes:

a storage step of storing a first threshold of battery voltage at which the communication operating system is disabled after starting up the communication operating system by executing the start-up sequence of the first wireless communication unit and a second threshold of battery voltage that is lower than the first threshold and at which the communication operating system is disabled after starting up the communication operating system by executing the start-up sequence of the second wireless communication unit without executing the start-up sequence of the first wireless communication unit; and a battery voltage detection step of detecting voltage of the battery, wherein the control step controls the communication operating system to be disabled when the battery voltage detected at the battery voltage detection step is equal to or less than the second threshold stored at the storage step after starting up the communication operating system by executing the start-up sequence of the second wireless communication unit.

Advantageous Effects on Invention

According to the present invention, in the case where an external apparatus including a second wireless communication unit is connected to an interface when a communication operating system is started up again after being disabled due to a decline in the battery voltage, the communication operating system is started up by executing a start-up sequence of the second wireless communication unit without executing a start-up sequence of a first wireless communication unit. Thus even if communication cannot be performed by a first wireless communication system of the first wireless communication unit due to the decline in the battery voltage, communication can be performed by a second wireless communication system of the second wireless communication unit, which allows a user to deal with an emergency contact quickly. Thus, multi-mode communication based on the battery voltage can be executed efficiently and user convenience can be improved.

BRIEF DESCRIPTION OF DRAWINGS

FIG. 7 is a diagram showing a first display example of a menu screen of the mobile communication terminal shown in FIG. 6;

FIG. 9 is a diagram showing a third display example of the menu screen of the mobile communication terminal shown in FIG. 6;

Figure 1:
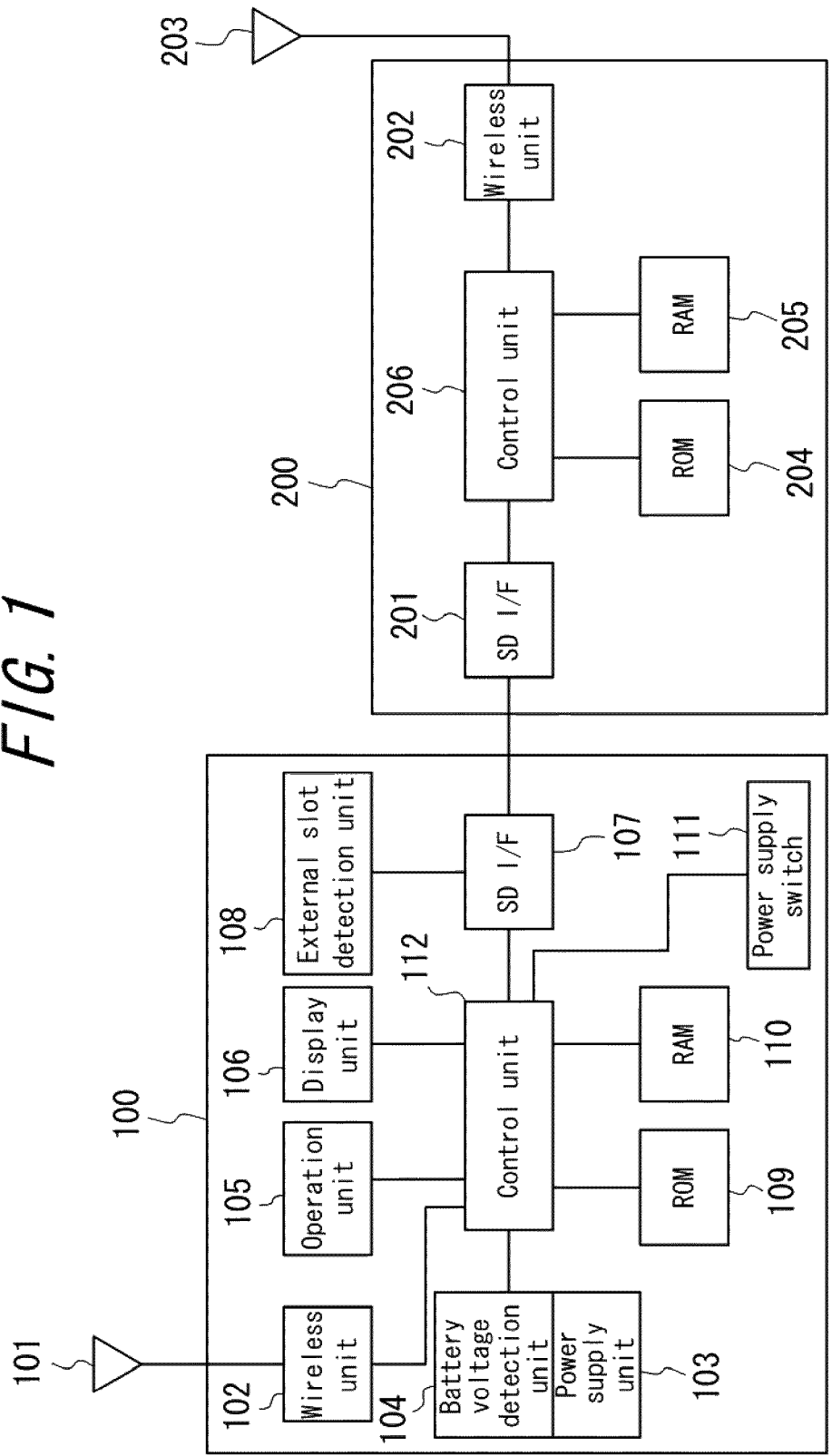
FIG. 1 is a functional block diagram showing a configuration of main units of a mobile communication terminal in accordance with a first embodiment of the present invention.

REFERENCE SIGNS LIST 100, 120, 130 Mobile communication terminal
101 Antenna
102 Wireless unit
103 Power supply unit
104 Battery voltage detection unit
105 Operation unit
106 Display unit
107 SD I/F
108 External slot detection unit
109 ROM
110 RAM
111 Power supply switch
112 Control unit
115 Charger connection unit
116 Charger detection unit
121 Infrared communication unit
122 Camera unit
123 Non-contact type IC card unit
124 TV/FM broadcast reception unit
125 External memory unit
200 SD wireless card
201 SD I/F
202 Wireless unit
203 Antenna
204 ROM
205 RAM
206 Control unit

DESCRIPTION OF THE PREFERRED EMBODIMENTS

Embodiments of the present invention will be described below with reference to the drawings.

First Embodiment

FIG. 1 is a functional block diagram showing a configuration of main units of a mobile communication terminal in accordance with a first embodiment of the present invention. The mobile communication terminal 100 is a mobile phone terminal and has an antenna 101, a wireless unit 102, a power supply unit 103 containing a battery, which is a secondary battery, a battery voltage detection unit 104 for detecting the battery voltage of the power supply unit 103, an operation unit 105 such as an input key or a touch panel, a display unit 106 such as an LCD (Liquid Crystal Display) or an OEL (Organic Electro Luminescence), an SD I/F 107 for inserting a card corresponding to SD I/F, an external slot detection unit 108 for detecting insertion of a card corresponding to SD I/F into the SD I/F 107, a ROM 109 and a RAM 110 on which software and the like are written, a power supply switch 111 for turning on the power supply of the terminal, and a control unit 112 for controlling overall operation. The power supply switch 111 may be provided to the operation unit 105 according to embodiments.

The wireless unit 102 constitutes a first wireless communication unit (hereinafter occasionally referred to as a main communication unit) corresponding to a first wireless communication system (hereinafter occasionally referred to as a main system) such as cdma 2000 1x or W-CDMA, which is a wireless communication system such as a cellular provided by a carrier. The wireless unit 102 has a transmission unit, a reception unit and the like and is capable of transmitting and receiving radio waves via the antenna 101. Here, for convenience of explanation, the main system is supposed to perform cdma2000 1x communication (hereinafter occasionally referred to as 1x system) accompanied with transmission and reception.

In addition, as a card corresponding to the SD I/F, an SD wireless card 200 can be inserted into or removed from the SD I/F 107. The SD wireless card 200 corresponds to a second wireless communication system (hereinafter occasionally referred to as a sub-system) and has an SD I/F 201, a wireless unit 202 and an antenna 203 constituting a second wireless communication unit (hereinafter occasionally referred to as a sub-communication unit) for performing communication by a sub-system, a ROM 204 and a RAM 205 on which software and the like of the sub-system are written and a control unit 206 for controlling overall operation.

By being inserted into the SD I/F 107 of the mobile communication terminal 100, the SD wireless card 200 is connected to the mobile communication terminal 100, and receives power supplied from the power supply unit 103 under the control of the control unit 112 in a state where the power supply switch 111 is ON, and thus communication can be executed by the sub-system. In addition, the sub-communication unit of the SD wireless card 200 can communicate at a lower voltage than the main communication unit of the mobile communication terminal 100, and is configured to have less power consumption than the main communication unit. Here, for convenience of explanation, it is supposed that the SD wireless card 200 performs WLAN communication.

Figure 2:
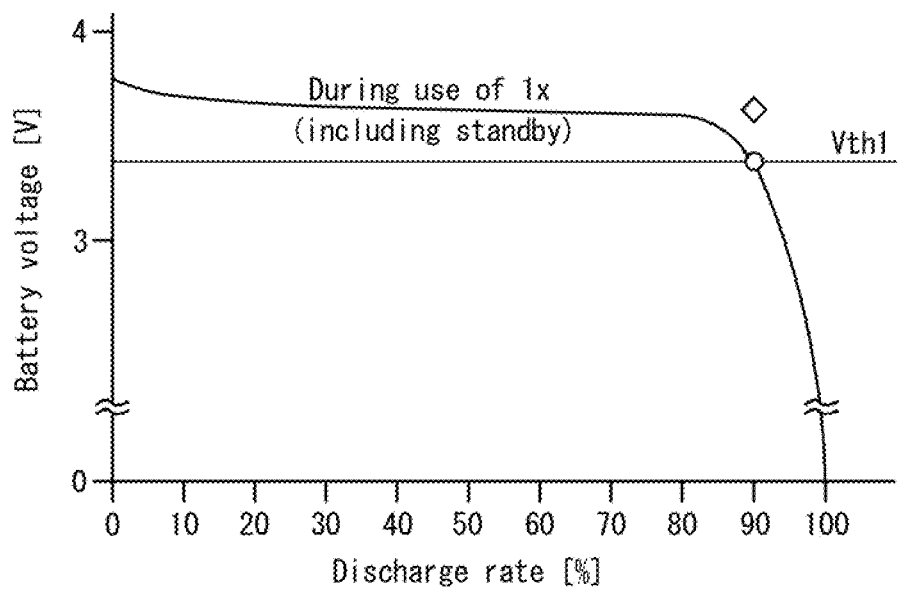
FIG. 2 is a diagram showing an example of a discharge rate-voltage characteristic of a battery constituting a power supply unit shown in FIG. 1.

FIG. 2 shows an example of a discharge rate-voltage characteristic of a battery constituting the power supply unit 103 shown in FIG. 1. In this case, the main communication unit is used. As shown in FIG. 2, as for a battery, in general, the voltage declines as the discharge rate increases and the voltage drop increases as the current increases. In addition, a lithium-ion battery with a rated voltage of 3.7V is normally used for a mobile phone terminal. A mobile phone terminal of 1x system is designed so that communication including being on standby is disabled when the battery voltage becomes around 3.4V, for example, and the power supply of the terminal is automatically turned off when the battery voltage drops to equal to or less than 3.3V. Because of this, in order to show the remaining battery level to the user, the mobile phone terminal of 1x system estimates the remaining battery level based on the battery voltage and displays it on the display unit 106 with 1 to 3 segment(s) of a battery mark, and then shows "Low Batt" when the battery voltage drops to equal to or less than 3.4V. Here, the Vth1 indicated in FIG. 2 is a first threshold, which is the lowest voltage for the main communication unit to continue communication.

In the mobile communication terminal 100 in accordance with the present embodiment, the power supply is turned off when the battery voltage detected by the battery voltage detection unit 104 is equal to or less than the first threshold (Vth1) while the main communication unit is used. However, the battery voltage detected at this time includes voltage drop caused by use of the main communication unit. Therefore, since there is no more voltage drop by the main communication unit after the power supply is turned off, the battery voltage recovers from the position marked with ○ (Vth1) to the position marked with ◇ in FIG. 2.

In this manner, in the case where the operation (system) of the terminal is disabled since the power supply is turned off due to a decline in the battery voltage, if the user turns on the power supply switch 111 and inputs power again without charging the battery, power is supplied to the main communication unit, which causes voltage drop. Therefore the battery voltage becomes equal to or less than the first threshold (Vth1) again. Because of this, the power supply of the terminal is turned off and the system is disabled. However, it is possible to input power again unless power is supplied to the main communication unit. For example, the battery voltage is kept to the voltage that exceeds the first threshold (Vth1) if power is supplied to the sub-communication unit whose power consumption is lower than that of the main communication unit. Therefore, communication is possible by the sub-system.

Consequently, in the case where a sub-communication unit is inserted when the power is input again after the power supply is turned off due to the decline in the battery voltage to equal to or less than the first threshold (Vth1), the mobile communication terminal 100 in accordance with the present embodiment changes the start-up sequence and starts up the communication operating system of the terminal by supplying power to the sub-system without supplying power to the main system.

Figure 3:
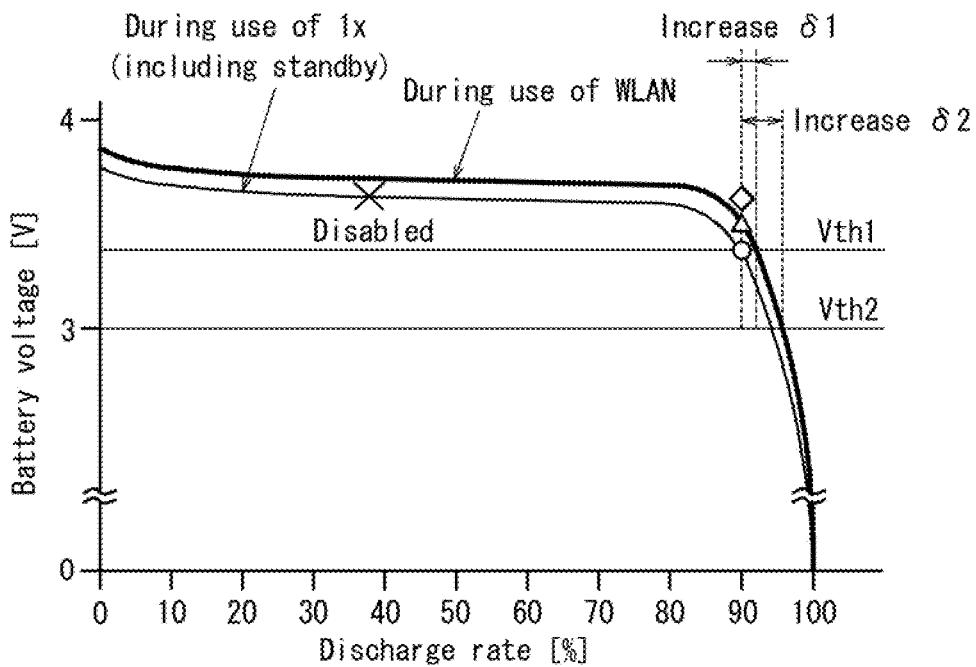
FIG. 3 is a diagram showing an example of a discharge rate-voltage characteristic of a battery after the power is input again.

FIG. 3 shows an example of a discharge rate-voltage characteristic of the battery after the power is input again in the above case. After the power is input again, power is not supplied to the main communication unit, but supplied to the sub-communication unit only. Therefore the battery voltage at the position marked with ◇ where the power is input again declines to the position marked with Δ due to voltage drop by the sub-communication unit. However, the voltage at the position marked with Δ is higher than the first threshold (Vth1) since the power consumption of the sub-communication unit is lower than that of the main communication unit and thus the voltage drop is small. Therefore in the case where the battery voltage at which the terminal is turned off is still the first threshold (Vth1), it is possible to perform communication using the sub-communication unit although it is for a short period of time (which corresponds to increase δ1 in the discharge rate shown in FIG. 3).

In this case, based on the main communication unit, the first threshold (Vth1) at which the power supply of the terminal is turned off is set to the voltage at which the main communication unit can maintain communication, which is 3.4V in this embodiment. However, in this case, after the power is input again, the main communication unit is not used, and the sub-communication unit that can be operated at a lower voltage than the main communication unit is used. Therefore, after the power is input again, it is not required to turn off the power supply of the terminal at the first threshold (Vth1), and it is possible to change the threshold at which the power supply is turned off. For example, suppose the operable voltage of the sub-communication unit is 2.7V, a higher voltage between the operable voltage and an operating voltage of the base band IC can be set as a second threshold (Vth2).

Consequently, in the mobile communication terminal 100 in accordance with the present embodiment, the second threshold (Vth2) is set to 3.0V based on the operating voltage of the base band IC>the operable voltage of the sub-communication unit. Thus it is possible to perform communication using the sub-communication unit during a period of time which corresponds to the increase δ2, which is larger than the increase δ1 in FIG. 3. The first threshold (Vth1) and the second threshold (Vth2) are stored previously in the ROM 109 or the RAM 110, which is a storage unit.

Next, operation when power is input again in the mobile communication terminal 100 in accordance with the present embodiment is described below with reference to flowcharts shown in FIGS. 4 and 5.

Figure 4:
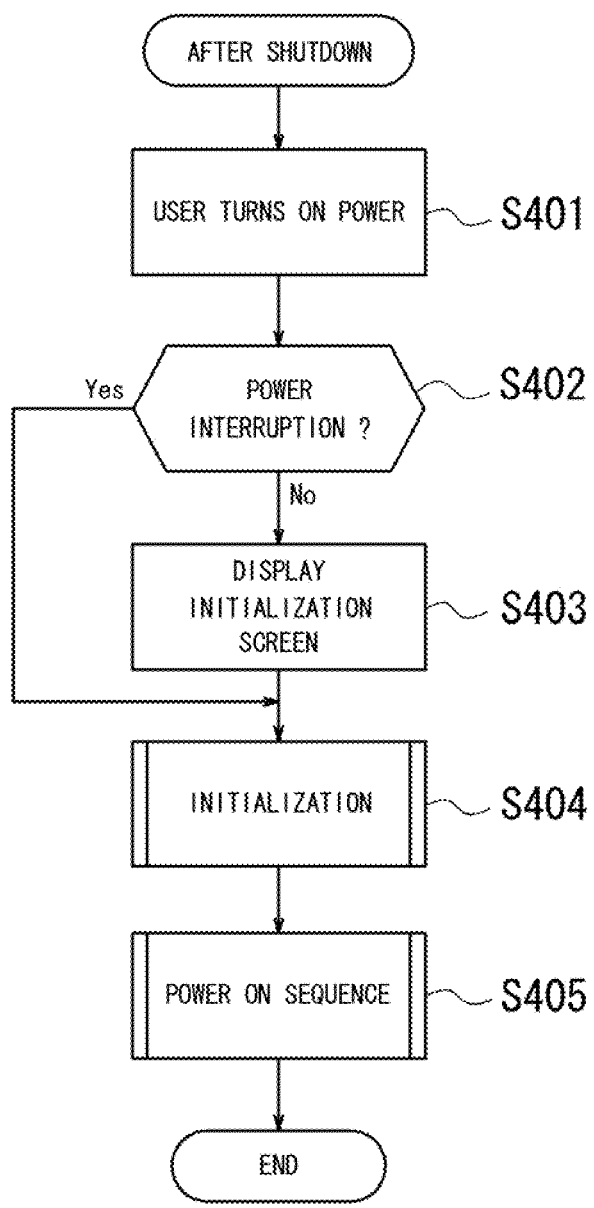
FIG. 4 is a flowchart showing an overall schematic operation when power is input again in the mobile communication terminal shown in FIG. 1.

FIG. 4 is a flowchart showing an overall schematic operation. After shutdown, when the user turns on the power supply switch 111 to input the power (step S401), the mobile communication terminal 100 in accordance with the present embodiment reads out a state of the terminal being shut down immediately before turned on, that is, the state when the power supply was turned off, from the shutdown information of a power IC (not shown) provided to the power supply unit 103 by the control unit 112 and detects whether or not the shutdown is caused by a power interruption due to decline in the battery voltage and not by the user operation (step S402).

As a result, if it is not the power interruption (the user turns off the power supply by himself at a hospital, in a plane and the like), the control unit 112 displays an initialization screen (step S403) to perform initialization (step S404) and shifts to a power ON sequence (step S405). On the contrary, if it is the power interruption, the control unit 112 shifts to the power ON sequence via the initialization process at step S404 without displaying the initialization screen at step S403.

Figure 5:
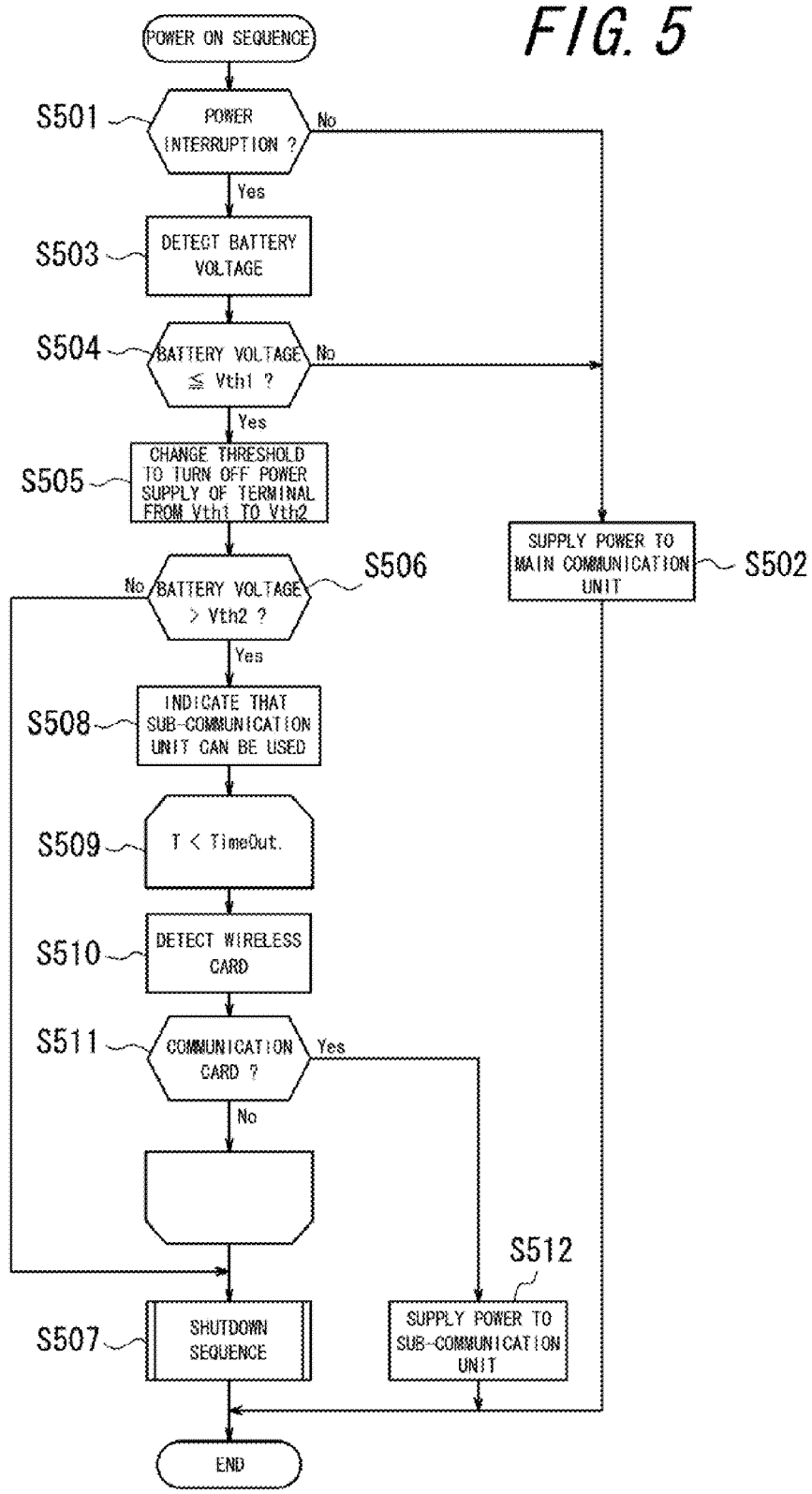
FIG. 5 is a flowchart of a schematic operation according to a power ON sequence shown in FIG. 4.

FIG. 5 is a flowchart showing a schematic operation of the power ON sequence shown in FIG. 4. In the power ON sequence, firstly, the control unit 112 determines the shutdown state immediately before turned on, which is read out at step S402 (step S501). Then if it is not the power interruption, the control unit 112 supplies power to the main communication unit to start up the terminal as usual (step S502).

On the other hand, if it is the power interruption, the control unit 112 detects the battery voltage of the power supply unit 103 using the battery voltage detection unit 104 (step S503) and determines whether or not the battery voltage subtracted by the voltage drop by the main communication unit exceeds the first threshold (Vth1) (step S504). As a result of that, if the battery voltage exceeds the first threshold (Vth1), it is considered that the battery is charged or during charge. Therefore the control unit 112 supplies power to the main communication unit and starts up the communication operating system of the terminal as usual at step S502. On the contrary, if the battery voltage is equal to or less than the first threshold (Vth1), the control unit 112 changes the threshold at which the power supply of the terminal is turned off from the first threshold (Vth1) to the second threshold (Vth2) (step S505) and determines whether or not the battery voltage exceeds Vth2 (step S506).

It should be noted that the battery voltage detection unit 104 may constantly detect the battery voltage of the power supply unit 103 and the control unit 112 may compare it with a predetermined threshold. The battery voltage detection unit 104 may also detect the battery voltage at predetermined periods and store the detected battery voltage in the RAM 110 with updating it and the control unit 112 may compare the latest battery voltage stored in the RAM 110 with the predetermined threshold.

At step S506, when the battery voltage subtracted by the voltage drop by the sub-communication unit is equal to or less than the second threshold (Vth2), since communication by the sub-communication unit is not possible, the control unit 112 shuts down the terminal according to the shutdown sequence (step S507). On the contrary, when the battery voltage subtracted by the voltage drop by the sub-communication unit exceeds the second threshold (Vth2), the control unit 112 notifies the user that the sub-communication unit can be used (step S508), controls the external slot detection unit 108 to detect insertion (connection) of a card corresponding to SD I/F into the SD I/F 107 for a certain period of time (TimeOut), and determines whether or not the card corresponding to SD I/F inserted into the SD I/F 107 is an SD wireless card 200 provided with a sub-communication unit (steps S509, S510 and S511). Therefore, the control unit 112 also constitutes a determination unit of an SD wireless card 200 provided with a sub-communication unit.

Here, in the case where an SD wireless card 200 is inserted into the SD I/F 107 by the user before the power is input again or in the certain period of time at step S508, and the SD wireless card 200 is detected at steps S510 and S511, the control unit 112 supplies power to the sub-communication unit of the SD wireless card 200 to start up the communication operating system of the terminal, which enables communication by the sub-system. On the contrary, in the case where the SD wireless card 200 is not detected in the certain period of time at steps S510 and S511, the control unit 112 shifts the process to step S507 and shuts down the terminal according to the shutdown sequence of the terminal. The voltage drop value of each communication unit described above is stored in a storage unit such as the ROM 109 and the RAM 110. Further, the voltage drop value of the sub-communication unit may be obtained and stored when the sub-communication unit is used.

As described above, in the case where the sub-communication unit is connected when the communication operating system is started up again after the communication operating system of the terminal by the main communication unit is disabled due to the decline in the battery voltage, the mobile communication terminal 100 in accordance with the present embodiment executes the start-up sequence of the sub-communication system to start up the communication operating system of the terminal and sets the second threshold of the battery voltage at which the communication operating system of the sub-communication unit is disabled to be lower than the first threshold of the battery voltage at which the communication operating system of the main communication unit is disabled. Thus even if it is impossible to perform communication by the main system of the main communication unit due to the decline in the battery voltage, it is possible to perform communication for a relatively long time by the sub-system of the sub-communication unit, which allows a user to deal with an emergency contact quickly. Thus the multi-mode communication can be executed efficiently based on the battery voltage and user convenience is improved.

Second Embodiment

In the mobile communication terminal capable of adding a sub-system as described above, when a sub-system is added, it is preferable that the user is able to recognize whether or not an application that uses a main system can be used. Consequently, the second embodiment of the present invention is designed so that the user can easily recognize a usable application when a sub-system is added.

Figure 6:
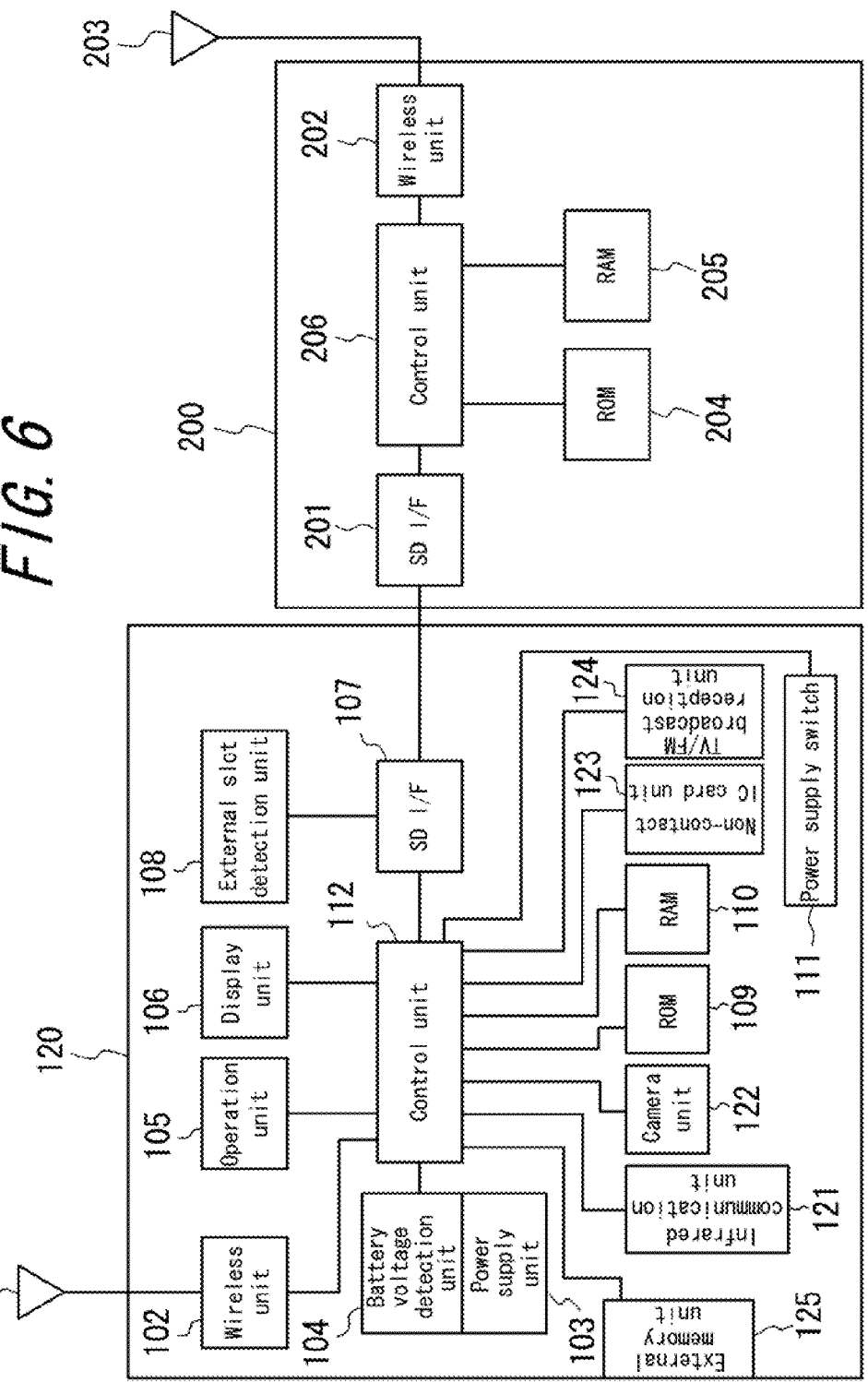
FIG. 6 is a functional block diagram showing a configuration of main units of a mobile communication terminal in accordance with a second embodiment of the present invention.

FIG. 6 is a functional block diagram showing a configuration of main units of a mobile communication terminal in accordance with a second embodiment of the present invention. The mobile communication terminal 120 has a configuration in which various known function units are added to the configuration of mobile communication terminal 100 shown in FIG. 1 based on the specification. Therefore, the identical reference numerals are given to the components constituting the same function as those shown in FIG. 1, and explanations thereof are omitted. As an example of added function units, FIG. 6 shows a case where an infrared communication unit 121, a camera unit 122, a non-contact type IC card unit 123, a TV/FM broadcast reception unit 124 and an external memory unit 125 to which an external memory such as a micro SD and the like can be inserted into and removed from are incorporated. These function units are driven under the control of the control unit 112 based on applications respectively corresponding to these units. Further, based on the specification, the mobile communication terminal 100 has various known functions such as a music play function, a messenger function, a game function and the like and the various applications can be executed by the control unit 112.

The mobile communication terminal 120 in accordance with the present embodiment operates in the same manner as the mobile communication terminal 100 in accordance with the first embodiment when an SD wireless card 200 is inserted into the SD I/F 107. However, in the present embodiment, a display screen showing activation of applications, that is, a menu screen, displayed on the display unit 106 is changed by the control unit 112. Display examples of the menu screen will be described below.

FIG. 7 is a first display example of the menu screen. FIG. 7(*a*) shows a menu screen when a main communication unit and a sub-communication unit are operating. FIG. 7(*b*) shows a menu screen when the main communication unit is disabled and only the sub-communication unit is operating.

All applications of the mobile communication terminal 120 are usable when the battery voltage exceeds the first threshold (Vth1) and the power is supplied to the main communication unit. Therefore, in this case, the control unit 112 controls the display unit 106 to display activation of various applications on the menu screen in a selectable manner as shown in FIG. 7(*a*). When an application of an activation display is selected in accordance with the display in a soft key area of the display unit 106, the control unit 112 controls the application to be executed. In addition, since the main communication unit is being used, the receiving sensitivity thereof is displayed in a pictogram area of the display unit 106.

Further, on the menu screen of FIG. 7(*a*), as activation displays of applications, "infrared" for executing an infrared communication function of the infrared communication unit 121, "camera" for executing a camera function of the camera unit 122, "FeliCa" for executing a communication function of the non-contact type IC card unit 123, "TV/FM" for executing a broadcast reception function of the TV/FM broadcast reception unit 124, "micro SD" for executing a function of the external memory unit 125, "data folder" for executing a data folder function, "carrier browser" for executing browser exclusive to a mobile phone carrier, "Music Player" for executing a music play function, "accessory" for executing an accessory function such as an address book, "Messenger" for executing a messenger function, "Game" for executing a game function and "function" for executing functions such as other various settings are displayed on the respective predetermined positions.

On the contrary, as described above, in the case where the power supply switch 111 is turned on and the power is input again after the power interruption not caused by the user operation, the power is supplied to the sub-communication unit to turn it on and the user can communicate in the sub-system under the following conditions: the battery voltage subtracted by the voltage drop by the main communication unit is equal to or less than the first threshold (Vth1), the battery voltage subtracted by the voltage drop by the sub-communication unit exceeds the second threshold (Vth2), and an SD wireless card 200 is inserted into the SD I/F 107. However, in this state, since the power is not supplied to the main communication unit, the communication network of a mobile phone carrier of the main communication unit can no longer be used. Therefore, the applications which require authorization by using the main communication unit such as "carrier browser", "Game" and the like are disabled. In addition, since IP addresses provided by a mobile phone carrier can no longer used, the application of "Messenger" is disabled.

Therefore, in this case, the control unit 112 changes the menu screen displayed on the display unit 106 to the menu screen indicating that the main communication unit is not usable. For example, as shown in FIG. 7(b), an activation display of an application that cannot be used unless the main communication unit is used is changed to a display indicating "not selectable". In FIG. 7(b), the display indicating "not selectable" is shown by shading. Thus the control unit 112 controls so that even if an application indicated as "not selectable" is selected, the application is not executed. Further, in FIG. 7(b), in the case of 1 seg broadcasting, for example, since "TV/FM" application may be accompanied with communication by the main communication unit, the activation display of such application accompanied with the use of the main communication unit is also changed to the display indicating "not selectable". Further, the display may be modified to a display that does not allow selection of the shaded areas.

Moreover, a message indicating that the main communication unit cannot be used because the battery voltage is equal to or less than the threshold is displayed on the menu display area to visually notify the user of it. FIG. 7(b) shows the case where "Low Battery Main System OFF" is displayed to notify that the main communication unit cannot be used. Further, in FIG. 7(b), in addition to the display indicating that the main communication unit cannot be used, "Sub" is displayed in the pictogram area to visually notify the user that only the sub-communication unit is operating. Thus the user can easily recognize the operating state of the mobile communication terminal 120 and the application that can be used.

Figure 8:
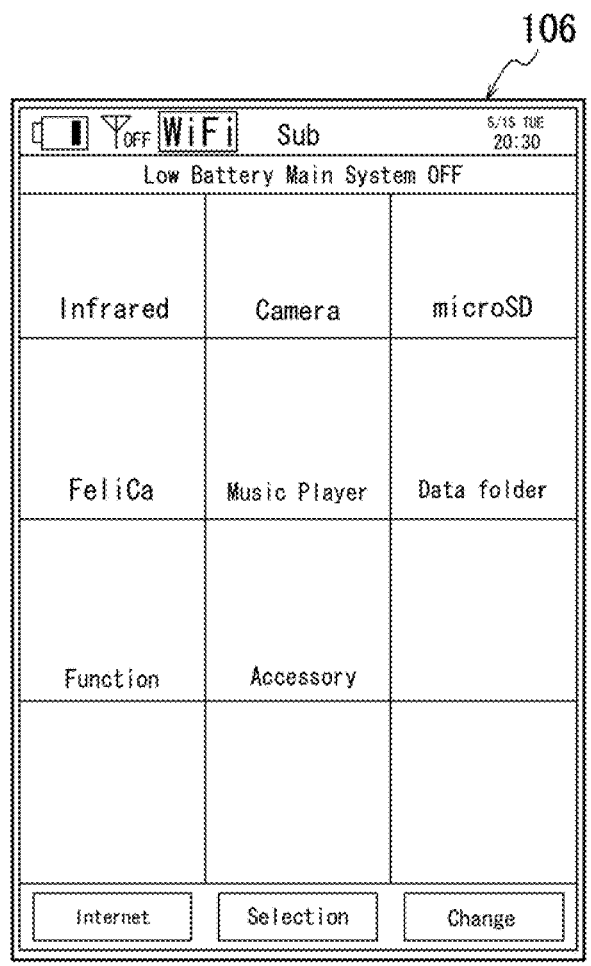
FIG. 8 is a diagram showing a second display example of the menu screen of the mobile communication terminal shown in FIG. 6.

FIG. 8 is a second display example of the menu screen, which shows the case where the power is supplied to the sub-communication unit. In this display example, activation displays of the applications of "carrier browser", "Game", "Messenger" and "TV/FM" that cannot be used unless the main communication unit is used are not displayed, and only activation displays of usable applications are displayed in a selectable manner without leaving space between icons. Therefore, it has the advantage that the user can recognize usable applications more easily.

Figure 9:
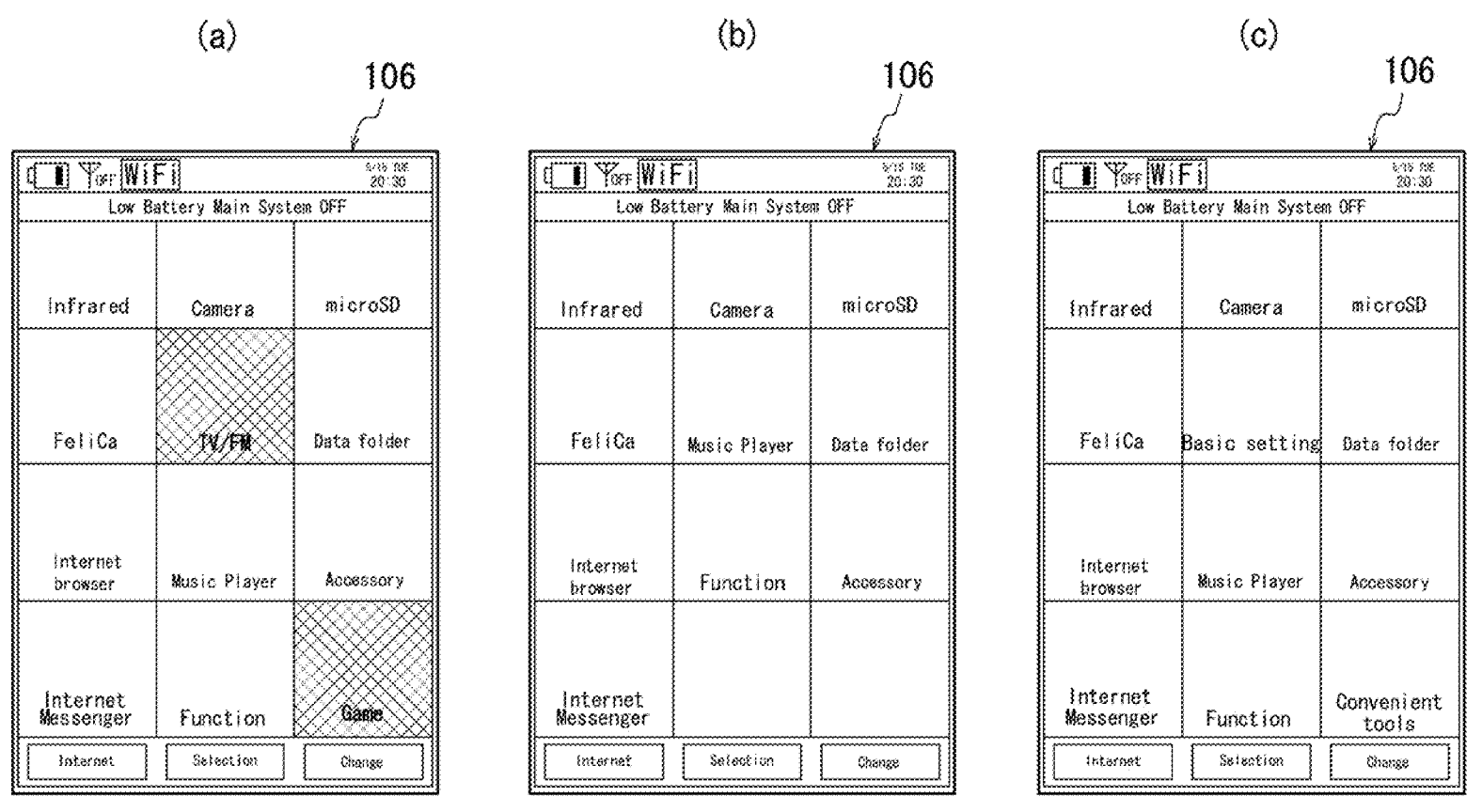

FIGS. 9(a) to (c) show a third display example of the menu screen, which shows three display manners of menu screen in the case where the power is supplied to the sub-communication unit. In these display examples, the menu screen is changed so that the activation display of an application that cannot be used due to disabled main communication unit is replaced with the activation display of an application which can be executed by the sub-communication unit, and the latter is displayed in a selectable manner. In this third display example, the activation displays of the applications such as "carrier browser" and "Messenger" by the main communication unit are replaced respectively with the activation displays of applications such as "Internet browser" and "Internet Messenger", which are the similar functions of the sub-communication unit.

In FIG. 9(a), the activation displays of executable applications including "Internet browser" and "Internet Messenger" that replaces the activation displays of the applications having the similar functions are displayed in a selectable manner, and the activation displays of the applications such as "TV/FM" and "Game" that cannot be replaced are displayed by being changed to the display indicating "not selectable" in the same manner as FIG. 7(b). In addition, as in the case of FIG. 8, FIG. 9(b) does not display the activation displays of the applications such as unusable "TV/FM" and "Game", and displays only the activation displays of the usable applications in a selectable manner without leaving space between icons. Further, in FIG. 9(c), instead of the activation displays of the unusable applications such as "TV/FM" and "Game", the activation displays of the frequently-used applications such as "Basic setting" and "Convenient tools" are displayed.

In this manner, when the activation displays of the applications that cannot be used due to disabled main communication unit are replaced with the activation displays of the applications that have the similar functions and can be executed by the sub-communication unit, and the latter is displayed in a selectable manner, the user can easily select an application having the similar function even if the main communication unit is disabled. Thus user convenience can be improved. Moreover, in the case where the communication operating system is started up by executing the start-up sequence of the sub-communication unit without executing the start-up sequence of the main communication unit, it is preferable that the display screen indicates that the main communication unit cannot be used. Of course, it is possible to determine that either the main communication unit or the sub-communication unit is operating and to select a display screen based on the determination.

As described above, the mobile communication terminal 120 in accordance with the present embodiment executes the start-up sequence of the sub-communication unit to start up the communication operating system of the terminal and displays a display screen indicating that the main communication unit cannot be used if the sub-communication unit is connected when the communication operating system is started up again after the communication operating system of the terminal of the main communication unit is disabled due to the decline in the battery voltage. Therefore, the user can easily recognize from the display screen that the applications using the main communication unit cannot be used, so that the user can deal with an emergency situation quickly by communicating with the sub-communication unit even when communication using the main communication unit is not allowed due to the decline in the battery voltage. Thus user convenience can be improved.

Third Embodiment

As described above, in a mobile communication terminal capable of adding a sub-system, when the power supply of the mobile communication terminal itself is abruptly turned off not by the user operation while communication is performed only by the sub-system, it is considered that the communication is continued while charging the battery by connecting a charger to the terminal. In this case, power may be supplied only to the sub-communication unit of the sub-system, and not supplied to the main communication unit of the main system to perform communication. In addition, in this case, the power supply of the terminal itself is turned on, however, as for the power supply of the main communication unit, it may be turned on by the user operation or automatically turned on when charge is started.

However, as the former, in the case where the power supply of the main communication unit is turned on by the user operation, if the user forgets turning on the power supply, it is not possible to respond to a call received by the main system. In addition, some users may want to start communication by immediately turning on the power supply of the main communication unit when a charger is connected to the terminal and charge is started. In this case, when the power supply button of the main communication unit is shared by that of the terminal, it is not possible to determine whether the user wants to turn off the power supply of the terminal itself or to turn on the power supply of the main communication unit.

On the other hand, as the latter, when the power supply of the main communication unit and the sub-communication unit is automatically turned on by starting charge, almost all of the power which is supplied from the charger is consumed by the main communication unit and the sub-communication unit. Therefore, battery charge requires a lot of time. Therefore, if the user pulls out the charger for some reason before the battery voltage reaches a predetermined voltage, the power supply of the terminal will be turned off again soon.

In this manner, in a mobile communication terminal capable of adding a sub-communication unit, if battery charge is started when the power supply of the terminal itself is turned off due to the decline in the battery voltage, there is concern that unexpected circumstances may occur to the user, such as the user cannot respond to a incoming call and the like because he forgets to do restoration operation of the main communication unit or even if the main communication unit is restored, the power supply of the terminal itself is turned off when charge is interrupted.

Thus, in a third embodiment of the present invention, when battery charge is started due to disabled main communication unit, the main communication unit can appropriately be restored without causing unexpected circumstances to the user, and thus the user convenience can be improved.

Figure 10:
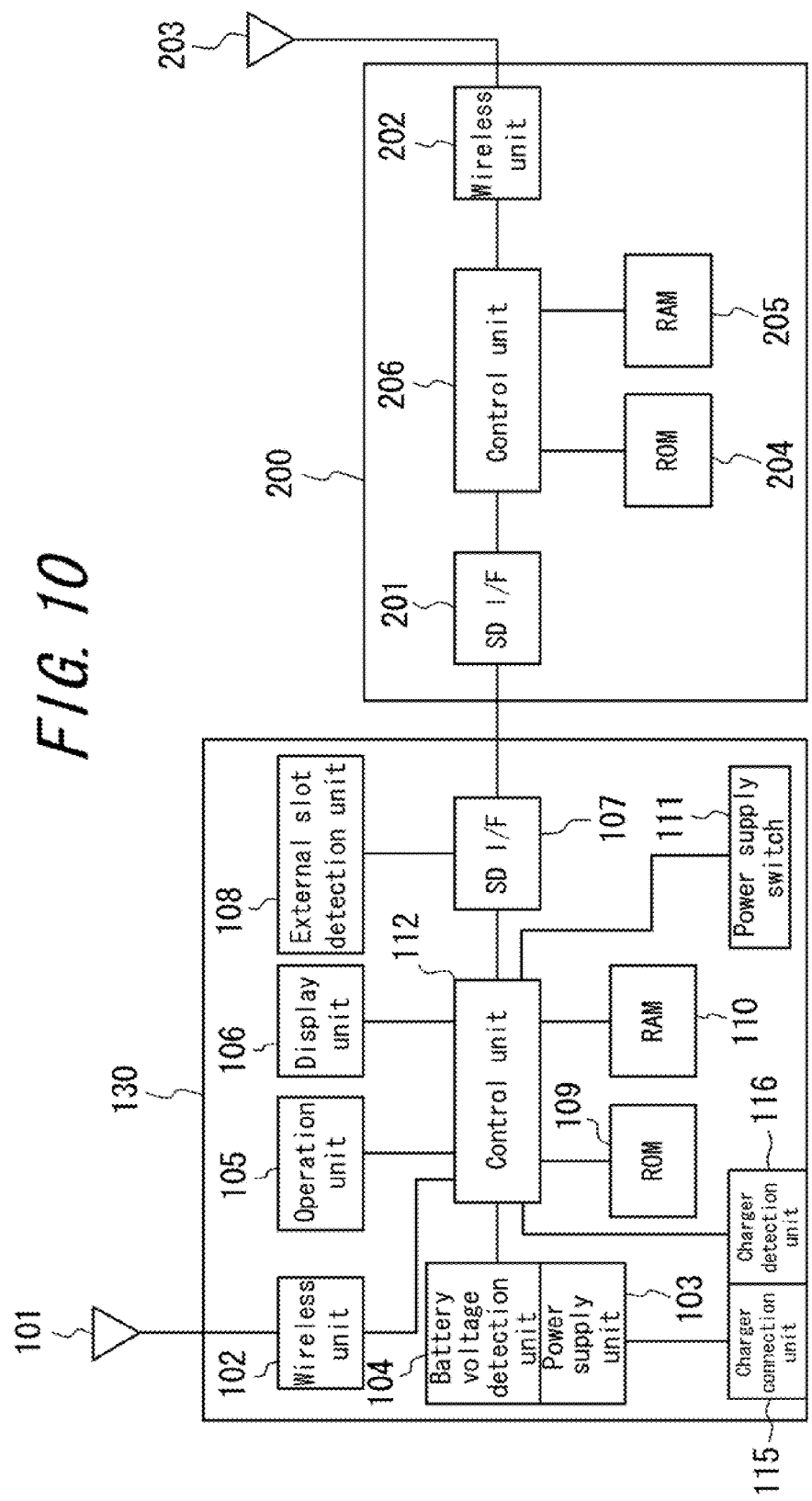
FIG. 10 is a functional block diagram showing a configuration of main units of a mobile communication terminal in accordance with a third embodiment of the present invention.

FIG. 10 is a functional block diagram showing a configuration of main units of a mobile communication terminal in accordance with the third embodiment of the present invention. The mobile communication terminal 130 has a construction in which the mobile communication terminal 100 shown in FIG. 1 is provided with a charger connection unit 115 to which a charger (not shown) such as an AC adapter and the like for charging the battery of the power supply unit 103 is detachably connected and a charger detection unit 116 for detecting battery charge by the charger via the charger connection unit 115. Therefore, the identical reference numerals are given to the components constituting the same functions as those shown in FIG. 1, and explanations thereof are omitted.

The mobile communication terminal 130 in accordance with the present embodiment operates in the same manner as the mobile communication terminal 100 in accordance with the first embodiment when an SD wireless card 200 is inserted into the SD I/F 107. However, in the present embodiment, when battery charge is started due to disabled main communication unit, the control unit 112 controls the restoration operation of the main communication unit.

The restoration operation of the main communication unit in the case where the main communication unit is turned off (OFF) and only the sub-communication unit is turned on (ON) due to low battery voltage is described below with reference to the flowchart shown in FIG. 11 and the example of display screen shown in FIG. 12.

First, based on the output from the charger detection unit 116, the control unit 112 detects whether or not a charger is connected to the charger connection unit 115 to start charging the battery, that is, whether or not the battery is being charged (step S601). Then when charge is started, the control unit 112 detects whether or not the power supply switch 111 is operated (step S602). As a result of that, if the power supply switch 111 is not operated, the control unit 112 waits for the battery voltage detected by the battery voltage detection unit 104 to exceed a predetermined value (the second predetermined value, in this case, it is Vth1) (step S603) and supplies power to the main communication unit to turn on the main communication unit (step S604).

On the contrary, when operation of the power supply switch 111 is detected at step S602, the control unit 112 displays a message (step S605) inquiring which of the main communication unit ON and terminal power supply OFF is intended as shown in FIG. 12(a) to ask the user to select either one of them (step S606). Since the main communication unit is OFF and only the sub-communication unit is operating in this state, in the present embodiment, "Low Battery Main System OFF" is displayed on the display unit 106 as shown in FIG. 12(a) and "OFF" is displayed near the antenna mark in the pictogram area as well to visually notify the user that the main communication unit cannot be used. Further, "Sub" is displayed in the pictogram area to visually notify the user that only the sub-communication is operating.

When the terminal power supply OFF is selected at step S606, the control unit 112 turns off the power supply of the terminal (step S607) and continues charge. On the contrary, when the main communication unit ON is selected, the control unit 112 supplies power to the main communication unit to turn on the main communication unit (step S608) and displays a message as shown in FIG. 12(b) on the display unit 106 to notify the user that the main communication unit is turned off if the charger is pulled out (step S609). In the case of FIG. 12(b), the battery voltage has not yet reached a predetermined value (the first predetermined value, and in this case, it is Vth1), while the main communication unit is turned on. Thus, in addition to the above message, a message indicating that the main communication unit cannot be used and only the sub-communication unit is operating is displayed as in the case of FIG. 12(a).

After that, when detecting that the battery voltage detected by the battery voltage detection unit 104 has exceeded the predetermined value (Vth1) (step S610), the control unit 112 changes the message displayed on the display unit 106 to the contents as shown in FIG. 12(c) to notify the user that the main communication unit can be used even if the charger is pulled out (step S611). In FIG. 12(c), a reception state is displayed near the antenna mark in the pictogram area and the displays of "Sub" and "Low Battery Main System OFF" are eliminated, and thus the state where the main communication unit is turned on and can be used is shown.

As described above, in the mobile communication terminal 130 in accordance with the present embodiment, in the case where the power supply switch 111 is not operated when charge is started under the condition where the sub-communication unit is ON and the main communication unit is OFF due to low battery voltage, the main communication unit is not turned on immediately, but is automatically turned on after the battery voltage is recovered to the level (the second predetermined value: Vth1) at which both the main communication unit and the sub-communication unit can keep communication. Thus it is possible to respond to incoming calls and the like at the main system and after the main communication unit is automatically turned on, it is possible to communicate at both communication units even if the user pulls out the charger for some reason.

In addition, when the power supply switch 111 is pushed after charge is started, the control unit 112 controls so that the selection screen as shown in FIG. 12(a) is displayed on the display unit 106 to ask the user to select either main communication unit ON or terminal power supply OFF. Then, when the main communication unit ON is selected, the control unit 112 controls so that the message shown in FIG. 12(b) is displayed on the display unit 106 until the battery voltage exceeds the predetermined value (Vth1) to call the user's attention not to pull out the charger, and then when the battery voltage exceeds the predetermined value (Vth1), the message shown in FIG. 12(c) is displayed on the display unit 106 to notify the user that communication can be performed even if the charger is pulled out. Therefore, it is possible to prevent the main communication unit from being disabled again due to abrupt pulling out of the charger. Thereby the main communication unit can appropriately be restored without causing unexpected circumstances to the user, and user convenience can be improved.

Figure 11:
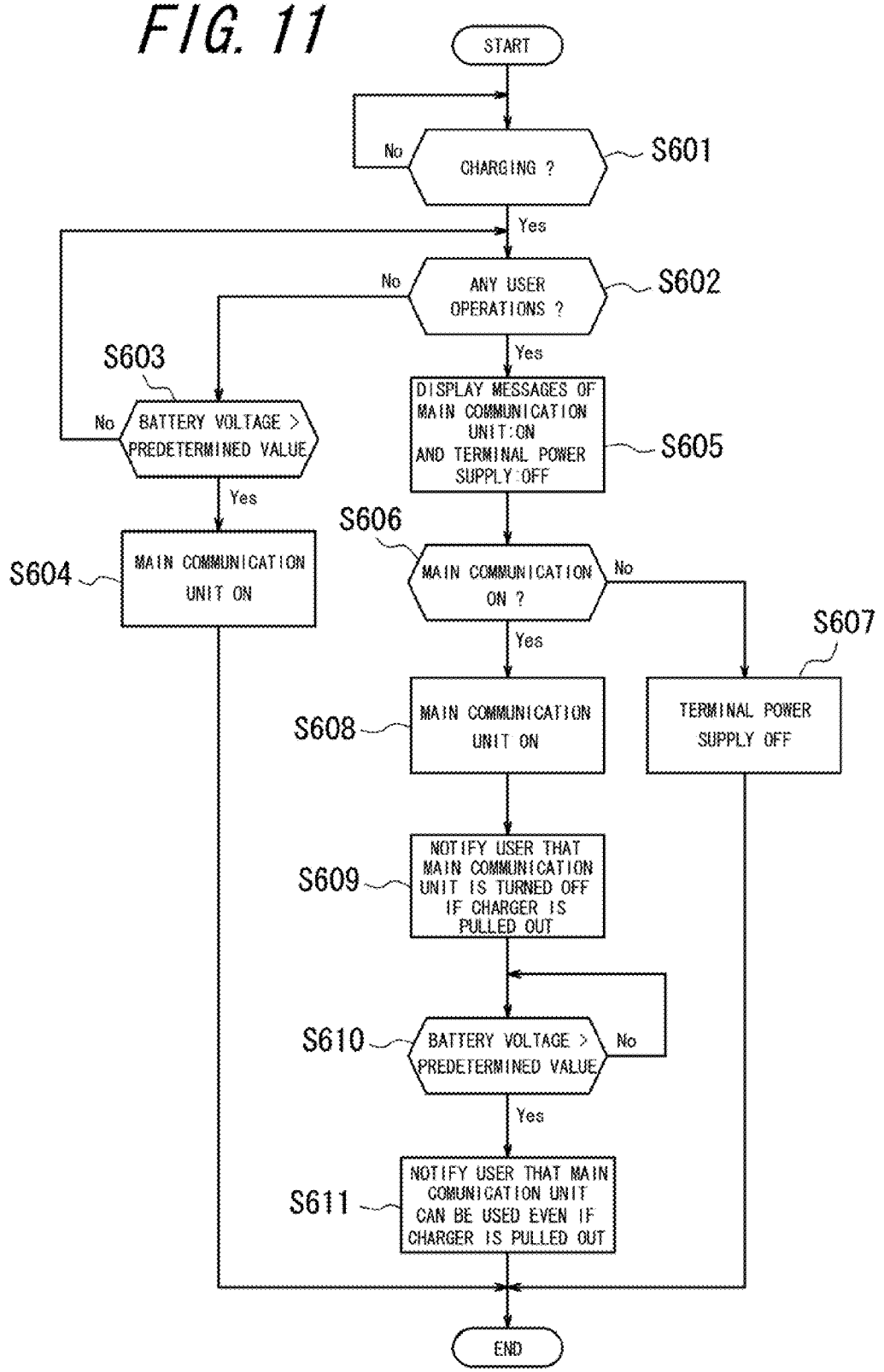
FIG. 11 is a flowchart illustrating a restoration operation example of a main communication unit of the mobile communication terminal shown in FIG. 10.
Figure 12:
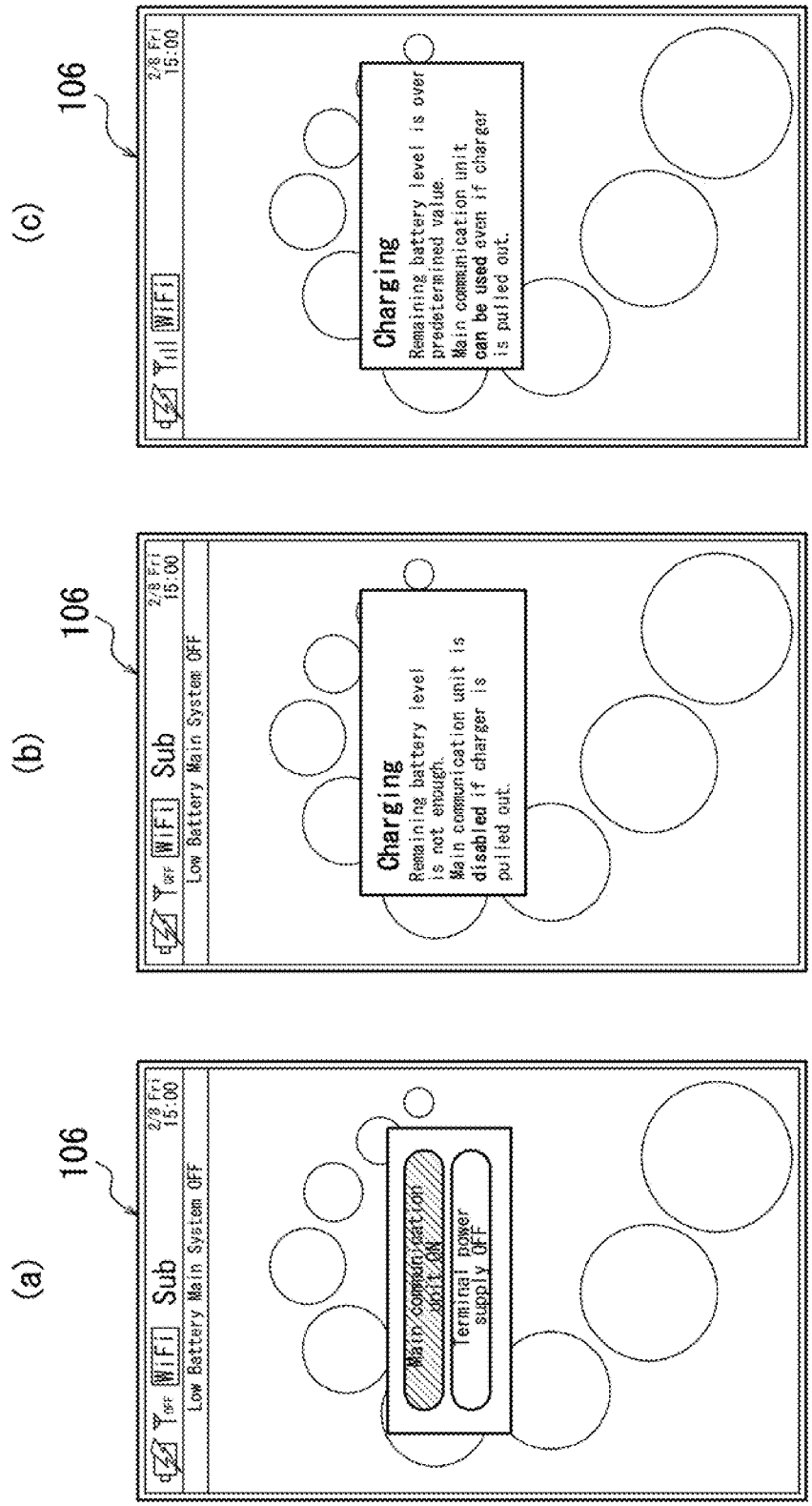
FIG. 12 is a diagram showing a screen display example according to the restoration operation of the main communication unit shown in FIG. 11.

With respect to the restoration operation of the main communication unit shown in FIG. 11, instead of the screen displays shown in FIGS. 12(a) to (c), or together with these screen displays, the similar notifications may be given to the user by use of audio or vibration function.

Fourth Embodiment

In a mobile communication terminal in accordance with each embodiment described above, when the power supply switch 111 is turned on to input power again after the power interruption not caused by the user operation, the power is supplied to the sub-communication unit and the sub-communication unit is turned on if the battery voltage including the voltage drop of each communication unit is equal to or less than the first threshold (Vth1) and exceeds the second threshold (Vth2), and an SD wireless card 200 is inserted into the SD I/F 107. Therefore the user can perform communication by the sub-system. In this manner, when only the sub-communication unit is used, displaying a battery mark based on the remaining battery level with respect to use of the sub-communication unit is effective for the user in recognizing whether or not the sub-communication unit can be used and avoiding unexpected circumstances such as abrupt power off and the like due to the decline in the battery voltage.

Consequently, in a fourth embodiment of the present invention, when the main communication unit is disabled by the control unit 112 in the mobile communication terminal shown in each embodiment described above, the battery mark indicating the remaining battery level is changed from the battery mark based on the main communication unit to that based on the sub-communication unit.

Figure 13:
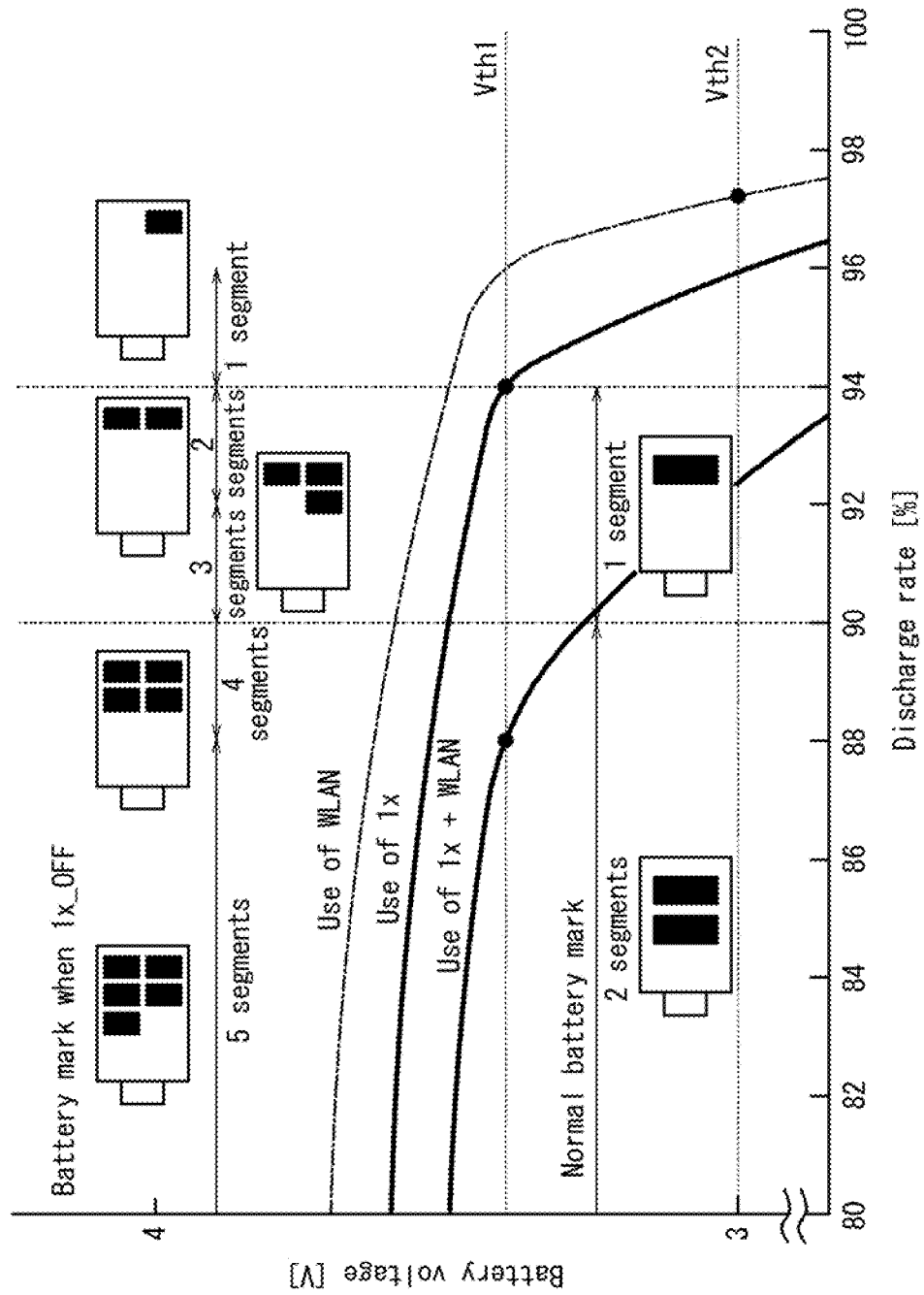
FIG. 13 is a diagram illustrating a display example of remaining battery level of a mobile communication terminal in accordance with a fourth embodiment of the present invention.

FIG. 13 illustrates a display example of the remaining battery level of the mobile communication terminal in accordance with the fourth embodiment of the present invention. The display example of the remaining battery level on the display unit 106 is described below by using the mobile communication terminal 100 shown in FIG. 1 as an example.

When only the main communication unit is used or both the main communication unit and the sub-communication unit are simultaneously used, as a normal battery mark based on the main communication unit, the control unit 112 controls to display a battery mark with three to one segment(s) in the pictogram area of the display unit 106 according to the remaining battery level. On the contrary, when only the sub-communication unit is used, the control unit 112 changes the display to the battery mark for 1x_OFF based on the sub-communication unit and displays a battery mark with eight to one segment(s) in the pictogram area of the display unit 106 according to the remaining battery level, in a manner of display different from the normal battery mark. In other words, as the battery mark based on the sub-communication unit, the remaining level mark indicating the remaining battery level is displayed in more segmentalized manner than that of the battery mark based on the main communication unit.

FIG. 13 shows the case where 1x is used as an aspect in which only the main communication unit is used, the case where 1x+WLAN are used as an aspect in which the main communication unit and the sub-communication unit are used and the case where WLAN is used as an aspect in which only the sub-communication unit is used. Further, in FIG. 13, a normal battery mark corresponds to the case where 1x is used and the battery mark for 1x_OFF corresponds to the case where WLAN is used.

Here, in the case where 1x is used, the battery voltage declines based on the discharge rate characteristics for the use of 1x. Therefore, in this case, for example, a battery mark of 3 segments (not shown) is displayed at the battery voltage corresponding to the discharge rate of 0-70%, a battery mark of 2 segments is displayed at the battery voltage corresponding to the discharge rate of 70-90%, and a battery mark of one segment is displayed at the battery voltage from a level corresponding to the discharge rate of 90% to Vth1, which is the minimum voltage at which the main communication unit can keep communication. Then when the battery voltage reaches Vth1, the power supply of the terminal is turned off.

Further, when WLAN is used during 1x_OFF, the battery voltage declines, in the same manner, based on the discharge rate characteristics for the use of WLAN. Therefore, in this case, for example, a battery mark of 8 segments (not shown) is displayed at the battery voltage corresponding to the discharge rate of 0-58%, a battery mark of 7 segments (not shown) is displayed at the battery voltage corresponding to the discharge rate of 58-70%, a battery mark of 6 segments (not shown) is displayed at the battery voltage corresponding to the discharge rate of 70-80%, a battery mark of 5 segments is displayed at the battery voltage corresponding to the discharge rate of 80-88%, a battery mark of 4 segments is displayed at the battery voltage corresponding to the discharge rate of 88-90%, a battery mark of 3 segments is displayed at the battery voltage corresponding to the discharge rate of 90-92%, a battery mark of 2 segments is displayed at the battery voltage corresponding to the discharge rate of 92~94%, and a battery mark of 1 segment is displayed at the battery voltage from a level corresponding to the discharge rate of 94% to V-th2, which is the minimum voltage at which the sub-communication unit can keep communication. Then when the battery voltage reaches Vth2, the power supply of the terminal is turned off.

In this manner, in the mobile communication terminal 100 in accordance with the present embodiment, when WLAN is used during 1x_OFF, even if the discharge rate reaches the level (remaining battery level) at which the power supply of the terminal is turned off when 1x is used, the battery voltage has not yet reached Vth2, which is the minimum voltage at which the sub-communication unit can keep communication. Therefore, a battery mark corresponding to the remaining battery level is displayed for the use of WLAN without turning off the power supply of the terminal. The relationship between the battery voltage corresponding to the above described aspects of the main communication unit and the sub-communication unit and the battery mark to be displayed may be stored in the ROM 109 or the RAM 110 beforehand, and based on the battery voltage detected by the battery voltage detection unit 104, display of the battery mark on the display unit 106 is controlled by the control unit 112. Thus, it is preferable that, in accordance with the operation of the above described embodiment, the battery mark is changed to a battery mark based on the sub-communication unit in the case where the communication operating system is started up by executing the start-up sequence of the sub-communication unit without executing the start-up sequence of the main communication unit. Thereby, a user can perform communication using the sub-communication unit while recognizing precisely the remaining battery level corresponding to the sub-communication unit. Of course, it is possible to select a battery mark after determining which of the main communication unit and the sub-communication unit is operating.

It should be noted that the present invention is not limited to the above described embodiments, and various modifications and changes are available. For example, the communication system by the main communication unit is not limited to the cdma 2000 1x communication, and may be cdma 2000, 1xEV-DO communication and other wireless communication systems. In addition, the sub-system by the sub-communication unit is not limited to WLAN and may be any communication system that is different from the main system. Further, the external apparatus is not limited to an SD card, and may be USB and the like. Moreover, in the above described embodiments, when communication by the sub-communication unit is performed, the threshold of the battery voltage at which the terminal is turned off is changed to the second threshold lower than the first threshold by the main communication unit. However, without changing the threshold, it is possible to adapt the threshold (Vth1) by the main communication unit as it is. In addition, it is possible to monitor the battery voltage while the power supply is ON and notify the user that the battery voltage is coming close to the threshold (Vth1) to prompt the user to insert an SD card into the sub-communication unit. In this case, it is possible to switch to the sub-communication unit without turning off the power supply of the terminal.

The invention claimed is:

1. A mobile communication terminal including a first wireless communication unit corresponding to a first wireless communication system and an interface capable of detachably connecting an external apparatus, and for starting up a communication operating system using a battery as a power supply, comprising:
    a determination unit for determining whether or not the external apparatus connected to the interface includes a second wireless communication unit corresponding to a second wireless communication system;
    a control unit for controlling the communication operating system to be started up by executing a start-up sequence of the second wireless communication unit without executing a start-up sequence of the first wireless communication unit, in a case where the determination unit determines that the second wireless communication unit is included when the communication operating system is started up again after being disabled due to a decline in voltage of the battery;
    a storage unit for storing a first threshold of battery voltage at which the communication operating system is disabled after starting up the communication operating system by executing the start-up sequence of the first wireless communication unit and a second threshold of battery voltage that is lower than the first threshold and at which the communication operating system is disabled after starting up the communication operating system by executing the start-up sequence of the second wireless communication unit without executing the start-up sequence of the first wireless communication unit; and
    a battery voltage detection unit for detecting voltage of the battery, wherein
    the control unit controls the communication operating system to be disabled when the battery voltage detected by the battery voltage detection unit is equal to or less than the second threshold after starting up the communication operating system by executing the start-up sequence of the second wireless communication unit.

2. The mobile communication terminal according to claim 1, wherein the second wireless communication unit has less power consumption than the first wireless communication unit.

3. The mobile communication terminal according to claim 2, further comprising:
    a storage unit for storing a first threshold of battery voltage at which the communication operating system is disabled after starting up the communication operating system by executing the start-up sequence of the first wireless communication unit and a second threshold of battery voltage that is lower than the first threshold and at which the communication operating system is disabled after starting up the communication operating system by executing the start-up sequence of the second wireless communication unit without executing the start-up sequence of the first wireless communication unit; and
    a battery voltage detection unit for detecting voltage of the battery,
wherein the control unit controls the communication operating system to be disabled when the battery voltage detected by the battery voltage detection unit is equal to or less than the second threshold after starting up the communication operating system by executing the start-up sequence of the second wireless communication unit.

4. The mobile communication terminal according to claim 1, further comprising:
    a display unit for displaying a display screen indicating that the first wireless communication unit cannot be used when the control unit starts up the communication operating system by executing the start-up sequence of the second wireless communication unit without executing the start-up sequence of the first wireless communication unit.

5. The mobile communication terminal according to claim 4, wherein the display unit displays a display screen on which an activation display of an application that cannot be used unless the first wireless communication unit is used is not displayed.

6. The mobile communication terminal according to claim 4, wherein the display unit displays a display screen on which an activation display of an application that cannot be used unless the first wireless communication unit is used is not selectable.

7. The mobile communication terminal according to claim 4, wherein the display unit changes a display screen so that an activation display of an application that cannot be used unless the first wireless communication unit is used is replaced with an activation display of an application that can be executed by the second wireless communication unit.

8. The mobile communication terminal according to claim 1, further comprising:
    a power supply operation unit for ON and OFF operations of a power supply; and
    a display unit for displaying a screen to select either to execute the start-up sequence of the first wireless communication unit or to turn off the power supply when the power supply operation unit is operated in a state where the control unit starts up the communication operating system by executing the start-up sequence of the second wireless communication unit without executing the start-up sequence of the first wireless communication unit.

9. The mobile communication terminal according to claim 8, comprising:
a battery voltage detection unit for detecting voltage of the battery; and
a detection unit for detecting whether or not the battery is being charged, wherein,
the control unit executes the start-up sequence of the first wireless communication unit when execution of the start-up sequence of the first wireless communication unit is selected; and
the display unit indicates that the first wireless communication unit is controlled to be in a disabled state if charge is discontinued, in a case where the battery voltage detected by the battery voltage detection unit is equal to or less than a first predetermined value in a state where the detection unit detects that the battery is being charged.

10. The mobile communication terminal according to claim 9, wherein,
the display unit indicates that the first wireless communication unit is not controlled to be in a disabled state even if charge is discontinued, in a case where the battery voltage detected by the battery voltage detection unit exceeds the first predetermined value in a state where the detection unit detects that the battery is being charged.

11. The mobile communication terminal according to claim 1, further comprising:
a battery voltage detection unit for detecting voltage of the battery, wherein, the control unit controls the start-up sequence of the first wireless communication unit to be executed when the battery voltage detected by the battery voltage detection unit exceeds a second predetermined value in a state where the communication operating system is started up by executing the start-up sequence of the second wireless communication unit without executing the start-up sequence of the first wireless communication unit.

12. The mobile communication terminal according to claim 1, further comprising:
a display unit for displaying a battery mark indicating a remaining battery level based on the second wireless communication unit when the control unit starts up the communication operating system by executing the start-up sequence of the second wireless communication unit without executing the start-up sequence of the first wireless communication unit.

13. The mobile communication terminal according to claim 12, wherein,
the display unit displays, as the battery mark based on the second wireless communication unit, a remaining level mark indicating a remaining battery level in a more segmentalized display manner than a battery mark based on the first wireless communication unit.

14. A control method of a mobile communication terminal including a first wireless communication unit corresponding to a first wireless communication system and an interface capable of detachably connecting an external apparatus, and for starting up a communication operating system using a battery as a power supply, comprising:
determining whether or not the external apparatus connected to the interface includes a second wireless communication unit corresponding to a second wireless communication system;
controlling the communication operating system to be started up by executing a start-up sequence of the second wireless communication unit without executing a start-up sequence of the first wireless communication unit, in a case where the second wireless communication unit is included when the communication operating system is started up again after being disabled due to a decline in voltage of the battery;
storing a first threshold of battery voltage at which the communication operating system is disabled after starting up the communication operating system by executing the start-up sequence of the first wireless communication unit and a second threshold of battery voltage that is lower than the first threshold and at which the communication operating system is disabled after starting up the communication operating system by executing the start-up sequence of the second wireless communication unit without executing the start-up sequence of the first wireless communication unit; and
detecting voltage of the battery, wherein
controlling the communication operating system to be started up includes controlling the communication operating system to be disabled when the battery voltage detected at the battery voltage detection step is equal to or less than the second threshold stored after starting up the communication operating system by executing the start-up sequence of the second wireless communication unit.

* * * * *